3,009,770
SILICON AND TITANIUM HALO-ALUMINUM COMPOSITIONS AND METHOD OF PREPARING THE SAME

Irvine W. Grote, Chattanooga, Tenn., assignor to The Chattanooga Medicine Company, Chattanooga, Tenn., a corporation of Tennessee
No Drawing. Filed Dec. 1, 1960, Ser. No. 73,165
7 Claims. (Cl. 23—85)

The present invention is directed to the preparation of improved halo-aluminum derivates of silicon and titanium.

The compositions of the present invention have bacteriostatic properties, astringent properties, and they can be used as anti-perspirant compositions.

The compositions of the present invention have the following empirical relationship:

$$1M : nAl : \left(4 + \frac{n-4}{2}\right)X$$

where M is a metal selected from the group consisting of silicon and titanium, X is a halide, either the chloride or the bromide, and n is an integer of at least four. The compounds of the present invention contain only oxygen atoms and hydrogen atoms in addition to the atoms of M, Al, and X defined in the empirical relationship set forth previously. At least some of the oxygen atoms and the hydrogen atoms are combined in the resulting complex as hydroxyl groups (although it is impossible to analyze for the hydroxyl groups with any degree of accuracy).

The number of aluminum atoms in the resulting compound is preferably in the range from 4 to 12. The resulting empirical relationships for this series of compounds, when n is an even number, is set forth in the following table:

| M | Al | X |
|---|----|---|
| 1 | 4  | 4 |
| 1 | 6  | 5 |
| 1 | 8  | 6 |
| 1 | 10 | 7 |
| 1 | 12 | 8 |

When n is an odd integer, the resulting composition is a mixture of the members of the series having aluminum contents of $n+1$ and $n-1$, but the empirical relationship set forth previously still holds.

An object of the present invention is to provide an improved series of halo-aluminum derivatives of silicon and titanium.

A further object of the invention is to provide an improved anti-perspirant composition containing the improved complexes of the present invention.

Still another object of the invention is to provide halo-aluminum derivatives of silicon and titanium which are stable, do not form gels during their synthesis, and are readily soluble in water.

A further object of the invention is to provide improved methods for the preparation of halo-aluminum derivatives of silicon and titanium.

The preferred method of preparation for the complexes of the present invention consists in first reacting a tetrahalide, either the tetrachloride or the tetrabromide of silicon or titanium with an aluminum alcoholate, preferably in the proportions of n moles of alcoholate for every mole of tetrahalide, where n is the molecular proportion of aluminum in the final product. The aluminum alcoholate employed is one containing from 1 to 5 carbon atoms in each of its alcoholate groups. Aluminum isopropylate is the preferred reactant because of its availability, and also because the reactions which it undergoes are readily controllable and do not require elevated temperature or pressure conditions.

The reaction product which results is then further reacted with water, or with water containing a sufficient amount of added chloride ions, to satisfy the empirical relationship set forth previously. From the empirical formula, it will be seen that sufficient halide ions are present in the water to provide one halide ion for every two aluminum atoms in excess of four aluminum atoms which will appear in the final complex. The most convenient means for providing the chloride ions is to carry out the reaction in the presence of added hydrochloric acid at room temperature.

The initial reaction is believed to proceed along the following lines:

$$MCl_4 + nAl(OR)_3 \rightarrow MAl_n(OR)_{3n}Cl_4$$

where R is the alkyl radial of the alcoholate. It is quite apparent that a chemical reaction has taken place because of the strong evolution of heat.

When the initial reaction product identified above is reacted in an aqueous medium or in an aqueous medium containing added chloride ions, the OR groups hydrolyze to form hydroxyl groups and when additional chloride ions are present in the reaction medium these are added in place of hydroxyl groups. The chlorhydrate which is formed is soluble in water, offering further proof of complex formation since the addition of either of the metal tetrahalides alone or of any of the aluminum alcoholates alone to water yields insoluble products.

Upon hydrolysis, in the presence of chloride ions, if required, the reaction proceeds as follows:

$$MAl_n(OR)_{3n}Cl_4 + \frac{(3n+4)}{2}H_2O + \frac{n-4}{2}HCl \longrightarrow$$

$$M(OAl)_nCl_{\left[4 + \frac{n-4}{2}\right]}(OH)_{\left[4 + \frac{n-4}{2}\right]} + 3nROH$$

Thus, representative members of the new family of complexes disclosed in the preceding table would have the formulae:

$$Ti(OAl)_4Cl_4(OH)_4$$
$$Ti(OAl)_6Cl_5(OH)_5$$
$$Si(OAl)_8Cl_6(OH)_6$$
$$Si(OAl)_{10}Cl_7(OH)_7$$

The compositions of the present invention are readily soluble in water, normally evidencing a solubility in excess of 25% by weight. The pH of the new family of complexes, in 10% solution in water, is in the range from 3.25 to 4.00 making them very suitable for use in anti-perspirant compositions.

An alternative procedure for preparing the complexes of the present invention consists in adding the preliminary reaction product between the tetrahalide and the aluminum alcoholate to a water solution of aluminum chlorhydrate. For example, the initial reaction product may contain one atom of titanium, four atoms of aluminum, and four atoms of chlorine and this reaction product is then reacted in water solution with two molecular portions of an aluminum chlorhydrate having the formula $Al_2(OH)_5Cl$ to yield a material having the empirical relationship of 1:8:6 between the titanium, aluminum and chloride constituents.

Example 1

204 grams (1 mole) of liquid aluminum isopropylate were placed in a flask. 27 ml. (¼ mole) titanium tetrachloride were added from a dropping funnel with constant stirring. The titanium tetrachloride was allowed to drop at a fairly fast rate, but not in a steady stream. Following the addition of all the titanium tetrachloride, stirring was continued for about 5 minutes to insure complete mixing. If the reaction mixture is allowed to cool, it will form a white solid.

Two hundred grams of the reaction mixture while still hot and in liquid form were added with constant stirring to 1000 ml. of cold distilled water. All of the reaction product dissolved. The volume was increased to 2000 ml. by adding more water. The isopropyl alcohol formed in the reaction was expelled by evaporating the resulting solution to a volume of 1000 ml. over a Bunsen burner. The pH of the final solution, at a concentration of 8.55% wt./vol. $Ti(OAl)_4Cl_4(OH)_4$ in water, was 3.65.

Example 2

204 grams (1 mole) of hot aluminum isopropylate were placed in a flask. 27 ml. of cold titanium tetrachloride were added from a dropping funnel with constant stirring. The titanium tetrachloride was allowed to drop at a fairly fast rate, but not in a steady stream. Following the addition of all the titanium tetrachloride, stirring was continued for about five minutes to insure complete mixing. The mixture solidified as it began to cool to form a white solid.

This initial reaction product, which contained one molecular proportion of titanium for four molecular proportions of aluminum and four molecular proportions of chlorine, was then reacted with varying amounts of chlorohydroxy aluminum in aqueous solution to produce titanium-aluminum-chlorine complexes having varying amounts of aluminum and chlorine. The complexes produced in this manner, and their pH values are given in the following table:

| Compound | Percent, w./v. | pH |
|---|---|---|
| 1 Ti-4 Al-4 Cl | 8.55 | 3.65 |
| 1 Ti-6 Al-5 Cl | 16.85 | 3.42 |
| 1 Ti-8 Al-6 Cl | 18.26 | 3.43 |
| 1 Ti-10 Al-7 Cl | 19.34 | 3.45 |
| 1 Ti-12 Al-8 Cl | 20.20 | 3.50 |
| 1 Ti-14 Al-9 Cl | 20.70 | 3.51 |
| 1 Ti-16 Al-10 Cl | 21.36 | 3.53 |

The corresponding silicon derivatives were made in the same way, except that silicon tetrachloride was substituted in the same molecular proportions for titanium tetrachloride of the previous example. The following table lists the corresponding properties of the silicon derivatives:

| Compound | Percent, w./v. | pH |
|---|---|---|
| 1 Si-4 Al-4 Cl | 12.5 | 3.5 |
| 1 Si-6 Al-5 Cl | 14.47 | 3.45 |
| 1 Si-8 Al-6 Cl | 16.01 | 3.42 |
| 1 Si-10 Al-7 Cl | 17.23 | 3.47 |
| 1 Si-12 Al-8 Cl | 18.22 | 3.48 |
| 1 Si-14 Al-9 Cl | 19.15 | 3.50 |
| 1 Si-16 Al-10 Cl | 19.73 | 3.50 |

Example 3

408 grams (2 moles) of liquid aluminum isopropylate were placed in a flask. 56.6 ml. (½ mole) of cold silicon tetrachloride were added from a dropping funnel with constant stirring. Following the addition of all the silicon tetrachloride, stirring was continued for 5 to 10 minutes to insure complete mixing. If the reaction mixture was allowed to cool, it formed a fairly clear thick solution.

Three hundred grams of the reaction mixture while still hot were added with constant stirring to 1000 ml. of distilled water. The volume was increased to 2000 ml. by adding additional water. The isopropyl alcohol from the reaction with water was then removed by evaporation of the solution to 1000 ml. over a Bunsen burner. The temperature of the reaction mixture was determined as 143° C., and the temperature of the water solution of the mixture was in the range from 70–72° C. The pH of the final solution, at a concentration of 12.5% wt./vol. $Si(OAl)_4Cl_4(OH)_4$ in water, was 3.5.

Example 4

408 grams (2 moles) of liquid aluminum isopropylate were placed in a flask. 54.5 ml. of cold titanium tetrachloride (½ mole) were added from a dropping funnel with constant stirring. Following the addition of all the titanium tetrachloride, stirring was continued from 5 to 10 minutes to insure complete mixing.

Three hundred grams of the above identified reaction mixture, while at a temperature of about 130° C., were added with constant stirring to 1000 ml. of cold distilled water. All of the reaction mixture dissolved. The volume was increased to 2000 ml. by adding water. The volume was reduced to 1000 ml. by evaporating over a Bunsen burner to expel the excess isopropyl alcohol. The pH of the final solution at a concentration of 12.8% wt./vol. of $Ti(OAl)_4Cl_4(OH)_4$ in water, was 3.75.

The products may be recoverd as a dry material by drying in a circulating hot air oven.

Example 5

612 grams (3 moles) of liquid aluminum isopropylate were placed in a flask. 54 ml. (½ mole) of titanium tetrachloride were added from a dropping funnel with constant stirring. The titanium tetrachloride was allowed to drop at a fairly fast rate, but not in a steady stream. Following the addition of all the titanium tetrachloride, stirring was continued for about 5 minutes to insure complete mixing.

The entire reaction mixture while still hot and in liquid form was added with constant stirring to 3 liters of water containing ½ mole of hydrochloric acid. The reaction product was dissolved with stirring. The volume was increased by adding 1 liter of water and the isopropyl alcohol formed in the reaction was removed by distillation. The resulting solution was adjusted to a volume of 3 liters.

It should be appreciated, of course, that other alcoholates can be substituted for the aluminum isopropylate employed in the examples with suitable changes in proportions. It should also be appreciated that the bromides can be substituted for the chloride of the examples, but the chlorides represent the preferred compositions.

The complexes of the present invention have marked anti-perspirant activity, when combined with suitable carriers such as lower alcohols, or solid cosmetic bases. The anti-perspirant activity was determined in the following manner:

At the beginning of a sweat stimulation period the human subjects were seated in a humidified, heated room maintained at a temperature of about 85° F. and 70% relative humidity. Their hands were held in warm water maintained at a temperature of 42–3° C. During the first 50 minute period the subjects held unweighed Webril pads in each axialla. At the end of this preliminary warmup period the axiallae were thoroughly dried and the unweighed pads replaced with pads which had been weighed in capped 2-ounce wide-mouth bottles. At the end of a 20 minute sweat stimulation period the pads were returned to their individual bottles. A second 20 minute collection was made immediately after the first collection with weighed pads was completed. The amount of sweat collected with each pad was determined by weighing the tared bottle and pad at the completion of the collection.

The same collection procedure was used for all control and post-treatment collections.

The subjects were instructed to abstain from the use of antiperspirant preparations for one week before the first control sweat collection. Control collections were made on three successive days. The sample to be tested was applied to one axialla of all subjects immediately following the control collection on the third day and one hour prior to the start of the sweat collection procedure on the next two successive days. Results are expressed as a percentage reduction of the treated axialla over the untreated axilla of each subject.

A 10% solution of $Ti(OAl)_4(OH)_4Cl_4$ in 20% isopropanol resulted in marked reduction in the sweating ratio of the test subjects. The average reduction was about 35% after two applications and about 40% after three applications.

A 10% solution of $Si(OAl)_4(OH)_4Cl_4$ in 20% isopropanol resulted in marked reduction in the sweating ratio of the test subjects, the average reduction being about 27% after two applications and about 37% after three applications.

It will also be evident that various other modifications can be made to the described embodiments without departing from the scope of the present invention.

This application is a continuation-in-part of my copending application, Serial No. 37,098, filed June 20, 1960, now abandoned.

I claim as my invention:

1. A composition of matter comprising a complex having the formula:

$$M(OAl)_nX_{\left[4+\frac{n-4}{2}\right]}(OH)_{\left[4+\frac{n-4}{2}\right]}$$

where M is a metal selected from the group consisting of silicon and titanium, X is a halide selected from the group consisting of the chloride and bromide, and $n$ is an integer of at least 4.

2. A composition of matter comprising a complex having the formula:

$$Ti(OAl)_4Cl_4(OH)_4$$

3. A composition of matter comprising a complex having the formula:

$$Si(OAl)_4Cl_4(OH)_4$$

4. A composition of matter comprising a complex having the formula:

$$M(OAl)_6Cl_5(OH)_5$$

where M is a metal selected from the group consisting of silicon and titanium.

5. A composition of matter comprising a complex having the formula:

$$M(OAl)_8Cl_6(OH)_6$$

where M is a metal selected from the group consisting of silicon and titanium.

6. A composition of matter comprising a complex having the formula:

$$M(OAl)_{10}Cl_7(OH)_7$$

where M is a metal selected from the group consisting of silicon and titanium.

7. The method of making a complex having the formula:

$$M(OAl)_nCl_{\left[4+\frac{n-4}{2}\right]}(OH)_{\left[4+\frac{n-4}{2}\right]}$$

where M is a metal selected from the group consisting of silicon and titanium, and $n$ is an integer of at least 4, which comprises reacting M tetrachloride with an aluminum alcoholate having from 1 to 5 carbon atoms in each of its alcoholate groups, and reacting the product thus produced with water containing an amount of hydrochloric acid sufficient to satisfy the number of chloride groups in the formula stated above.

References Cited in the file of this patent

UNITED STATES PATENTS

| | | |
|---|---|---|
| 2,481,273 | Young | Sept. 6, 1949 |
| 2,687,423 | Mesirow | Aug. 24, 1954 |
| 2,906,668 | Beekman | Sept. 29, 1959 |